(12) United States Patent
Bernhardt et al.

(10) Patent No.: US 9,965,964 B2
(45) Date of Patent: May 8, 2018

(54) MULTI-DIMENSIONAL MAP

(71) Applicant: HERE Global B.V., Eindhoven (NL)

(72) Inventors: Bruce Bernhardt, Wauconda, IL (US); Arnold Sheynman, Northbrook, IL (US); Jingwei Xu, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 150 days.

(21) Appl. No.: 14/823,208

(22) Filed: Aug. 11, 2015

(65) Prior Publication Data

US 2017/0046960 A1   Feb. 16, 2017

(51) Int. Cl.
  *G08G 5/00*   (2006.01)
  *B64C 39/02*  (2006.01)
  *G01C 21/00*  (2006.01)
  *G05D 1/10*   (2006.01)

(52) U.S. Cl.
  CPC ......... *G08G 5/0069* (2013.01); *B64C 39/024* (2013.01); *G01C 21/005* (2013.01); *G05D 1/101* (2013.01); *G08G 5/006* (2013.01); *G08G 5/0021* (2013.01); *G08G 5/0034* (2013.01); *G08G 5/0039* (2013.01); *G08G 5/0086* (2013.01)

(58) Field of Classification Search
  CPC .. G08G 5/0069; B64C 39/024; G01C 21/005; G05D 1/101
  See application file for complete search history.

(56) References Cited

U.S. PATENT DOCUMENTS

2012/0158280 A1   6/2012  Ravenscroft
2014/0303884 A1  10/2014  Levien et al.
2015/0336667 A1* 11/2015  Srivastava ............ B64C 39/024
                                                701/2

FOREIGN PATENT DOCUMENTS

EP          2 685 336 A1     1/2014

OTHER PUBLICATIONS

International Search Report and Written Opinion for Application No. PCT/IB2016/065760 dated Nov. 16, 2016.
Andert, F. et al., *Online World Modeling and Path Planning for an Unmanned Helicopter*, Auto Robot, vol. 27, No. 3 (Aug. 19, 2009) 147-164.

* cited by examiner

*Primary Examiner* — Basil T. Jos
(74) *Attorney, Agent, or Firm* — Alston & Bird LLP

(57) ABSTRACT

A method including retrieving a multi-dimensional map from a navigation system memory; determining an aerial route between two locations based at least partially upon the multi-dimensional map; and storing the aerial route in the navigation system memory. The multi-dimensional map includes terrain information and object information. The object information includes information regarding location and size of objects extending above ground level. The objects are in uncontrolled airspace, and the object information includes height information regarding a height above ground level of at least some of the objects. The aerial route is limited to the uncontrolled airspace, where the aerial route is over and around at least some of the objects, and where the aerial route is determined, at least partially, based upon the height information of the objects.

16 Claims, 3 Drawing Sheets

MULTI-DIMENSIONAL MAP

BACKGROUND

Technical Field

The exemplary and non-limiting embodiments relate generally to a map and, more particularly, to a multi-dimensional map.

Brief Description of Prior Developments

Maps are used in navigation systems to allow a user to navigate to a location. Navigation system maps are known which include road information and can be updated with traffic conditions for example.

SUMMARY

The following summary is merely intended to be exemplary. The summary is not intended to limit the scope of the claims.

In accordance with one aspect, an example method comprises retrieving a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding a height above ground level of at least some of the objects; determining an aerial route between two locations based at least partially upon the multi-dimensional map, where the aerial route is limited to the uncontrolled airspace, where the aerial route is over and around at least some of the objects, and where the aerial route is determined, at least partially, based upon the height information of the objects; and storing the aerial route in the navigation system memory.

In accordance with another aspect, an example embodiment is provided in an apparatus comprising at least one processor; and at least one non-transitory memory including computer program code, the at least one memory and the computer program code configured to, with the at least one processor, cause the apparatus to: retrieve a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding a height above ground level of at least some of the objects; determine an aerial route between two locations based at least partially upon the multi-dimensional map, where the aerial route is limited to the uncontrolled airspace, where the aerial route is over and around at least some of the objects, and where the aerial route is determined, at least partially, based upon the height information of the objects; and store the aerial route in the navigation system memory.

In accordance with another aspect, an example embodiment is provided in a non-transitory program storage device readable by a machine, tangibly embodying a program of instructions executable by the machine for performing operations, the operations comprising: retrieving a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding height above ground level of at least some of the objects; determining an aerial route between two locations based at least partially upon the multi-dimensional map, where the aerial route is limited to the uncontrolled airspace, where the aerial route is over and around at least some of the objects, and where the aerial route is determined, at least partially, based upon the height information of the objects; and storing the aerial route in the navigation system memory.

In accordance with another aspect, an example embodiment is provided in an apparatus comprising means for retrieving a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding a height above ground level of at least some of the objects; means for determining an aerial route between two locations based at least partially upon the multi-dimensional map, where the aerial route is limited to the uncontrolled airspace, where the aerial route is over and around at least some of the objects, and where the aerial route is determined, at least partially, based upon the height information of the objects; and means for storing the aerial route in the navigation system memory.

In accordance with another aspect, an example method comprises obtaining object information regarding location and size of objects extending upward above ground level, where the objects are in uncontrolled airspace, and where the object information includes height information regarding height of the objects above ground level; combining the object information with a map, including terrain information, to form a multi-dimensional map which includes the terrain information and the object information; and storing the multi-dimensional map in a navigation system for aerial navigation of a device in the only uncontrolled airspace over and around the objects in the uncontrolled airspace.

BRIEF DESCRIPTION OF THE DRAWINGS

The foregoing aspects and other features are explained in the following description, taken in connection with the accompanying drawings, wherein.

DETAILED DESCRIPTION OF EMBODIMENTS

Figure 1:
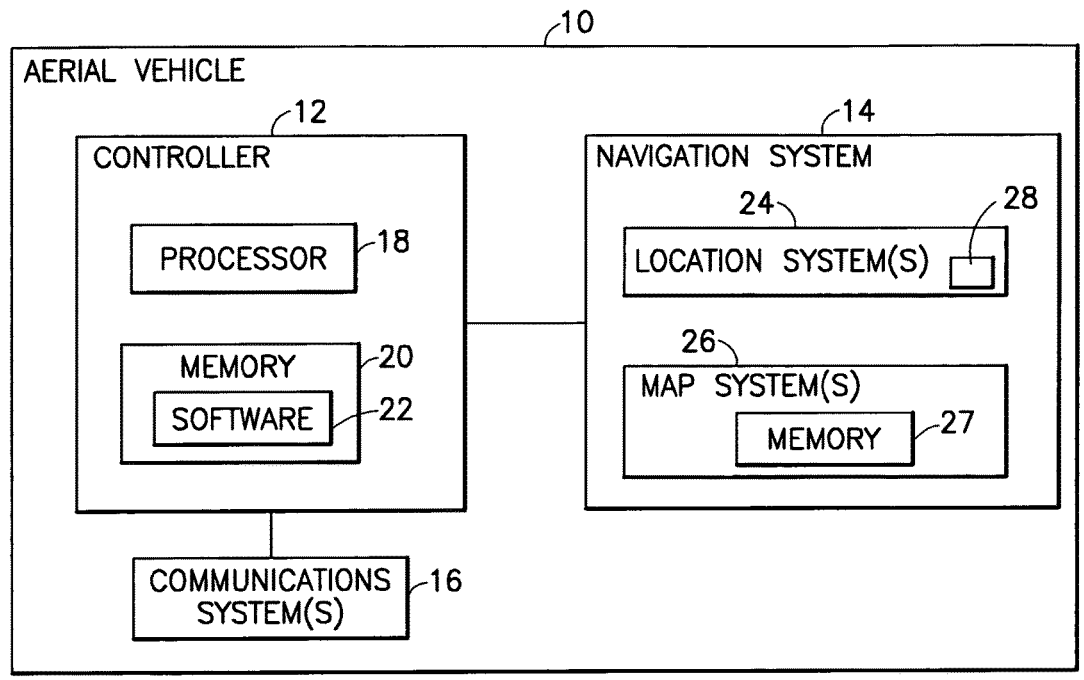
FIG. 1 is a diagram illustrating an aerial vehicle comprising features as described herein.

Referring to FIG. 1, there is shown a diagram illustrating an aerial vehicle 10 incorporating features of an example embodiment. Although the features will be described with reference to the example embodiments shown in the drawings, it should be understood that features can be embodied in many alternate forms of embodiments. In addition, any suitable size, shape or type of elements or materials could be used.

In one example embodiment the aerial vehicle is an unmanned aerial vehicle (UAV) such as an autonomous or semi-autonomous UAV for example. The vehicle 10 includes at least one controller 12, a navigation system 14 and at least one communications system 16. The vehicle 10 also comprises other components (not shown) such as at least one motor for example. The controller 12 includes at least one processor 18 and at least one memory 20 which includes software 22. The communications system 16 may comprise a transmitter and a receiver for radio frequency communications for example. The navigation system 14 may include at least one location system 24 and at least one map system 26. The location system may include, for example, a Global Positioning System (GPS) receiver and an altimeter. The navigation system may also comprise a proximity detector, perhaps as part of the location system(s) 24 for sensing location of the vehicle 10 relative to other items.

The map system(s) 26 generally comprises at least one map which may be used to allow the vehicle 10 to navigate in airspace to a destination. The at least one map includes conventional two-dimensional map information, but also includes other information to form a multi-dimensional map (a non-two-dimensional map).

New technology is emerging that allows for vehicles to travel above the ground, but below the altitudes where safe travel without concern for obstructions or other impediments may occur. Features as described herein provide an approach for creating multi-dimensional mapping algorithms to define and allow for safe navigation above the ground, but below controlled airspace such as defined by the United States Federal Aviation Authority, the European Joint Aviation Authority, or similar national authority protected airspace for commercial airline traffic. More specifically, in airspace where objects extend upward from the ground, such as houses, buildings, radio towers, etc., perhaps lower than 100-200 feet for example.

One type of transport method is by manned airplane where direct or almost direct travel may occur at relatively high altitudes above the earth where there are no obstructions to flight except for other aircraft. The safety of travel via airplane is governed by strict air traffic control protocols in controlled airspace. Controlled airspace is airspace of defined dimensions within which Air Traffic Control (ATC) services are provided. The level of control varies with different classes of airspace. Uncontrolled airspace is the opposite of controlled airspace. The International Civil Aviation Organization (ICAO) classifies airspace in seven classes from classes A to G. Controlled airspace is in classes A to E, in order of decreasing ATC regulation of flights. Uncontrolled airspace is the opposite of controlled airspace and includes airspace in classes F and G. Outside of emergency situations the only time ground obstructions may be a factor are the times when an airplane is departing or arriving at an airport. Obstructions near such locations are strictly regulated and any obstructions, even temporary ones, which may impact safe travel are charted to notify the pilots of their locations and potential issues.

Features as described herein are in regard to unmanned aircraft system (UAS) uncontrolled airspace. As used herein, UAS uncontrolled airspace is intended to mean airspace in classes F or G, and in an area where ground obstructions are normally present, such as relatively close to the ground below 100-200 feet above the ground for example. This UAS uncontrolled airspace is airspace in which manned commercial aircraft do not normally fly, such as between buildings or a few feet above treetops for example. Manned aerial vehicles (such as fixed-wing and variable wing) do not ordinarily travel in this type of UAS uncontrolled airspace, except during takeoff or landing, or perhaps military aircraft during war and helicopters during police or medical emergencies. Military autonomous and semi-autonomous UAVs do not ordinarily travel in this type of UAS uncontrolled airspace, except when controlled by an operator within line of sight of the vehicle.

This disclosure provides an approach for creating multi-dimensional mapping algorithms to allow for safe navigation above the ground, but below the United States Federal Aviation Authority, the European Joint Aviation Authority, or similar national authority protected airspace for commercial airline traffic. Features as described herein may be used to provide a multi-dimensional mapping model approach. This approach may comprise, for example:
1. Create a 3-dimensional map for routing drones through permissible areas.
2. Create aerial traffic lanes (such as lanes that meet government criteria for safety and privacy for example)
3. Create allowable areas for movement, provide areas of restriction. Include climb and descent buffers and safety landing areas.
4. Create metadata to allow aerial traffic lanes being dynamically managed (one direction or direction, aerial road closure, etc.
5. Create geo-location codes to define routes and intersections of these routes.

With features as described herein, aerial road works, similar to automotive roads, may be created. This may be added to, or updated with, information regarding for example:
   obstructions based on altitude, such as electrical wires, bridge overpasses, tunnels with limited heights;
   the ability to designate prohibited zones above and around areas to be protected. Examples of possible structures that may require prohibited zones may include, for example, hospitals or police stations where aircraft even flying at a higher altitude would normally be prohibited;
   minimum heights for traversal of a predetermined area;
   corridors below the heights of safe traversal that allow navigable paths between/around structures;
   geolocation codes for each area.

In planning of the aerial routes, the mapping used for the navigation may take into consideration other near-earth practical considerations, such as future tree growth and buffer zones around certain areas which may be intruded upon due to human activity (accidental or otherwise). For example, an aerial lane might have a buffer zone around a golf course or a baseball field. In planning of the aerial roads or lanes, the mapping may take into consideration how the lanes may impact humans, such as providing time zone limitations or prohibit aerial roads or lanes such as to not disturb people sleeping or national parks for example.

Today's vehicle traffic is predominantly on road networks on the surface of the earth. These land road networks are well defined and the placement of the roads is well mapped. Navigation routing on the land road network is well understood with algorithms developed to provide travel optimizations such as the shortest travel time or the lowest costs to get from one location to another. In one type of example, aerial lanes may be at least partially defined based upon the road networks on the surface of the earth. In other words, the aerial lanes may be defined along, but aerially spaced over, the land roads. Thus, the locations of the land roads from a 2-dimensional map may be used as an initial basis for establishing the aerial road map to be used for a route of a UAV. Travel directly over a land road for a majority of the flight time might take longer than a direct route between a starting location and the destination, but this may provide less likelihood of collision of the UAV with another object (especially if the majority of the vehicle's aerial travel is over the land road). The communication system(s) 16 may include an ability of multiple UAVs to communicate with one another to avoid direct contact during flight.

Features as described herein may be used with a new technology that allows for vehicles to travel above the ground, but below the altitudes where safe travel without concern for obstructions or other impediments may occur. The features described herein include a method for safe travel when a vehicle is above the ground, but below the altitude where no obstructions are present. It is at these altitudes that unmanned aircraft system (UAS) vehicles are expected to travel.

Figure 2:
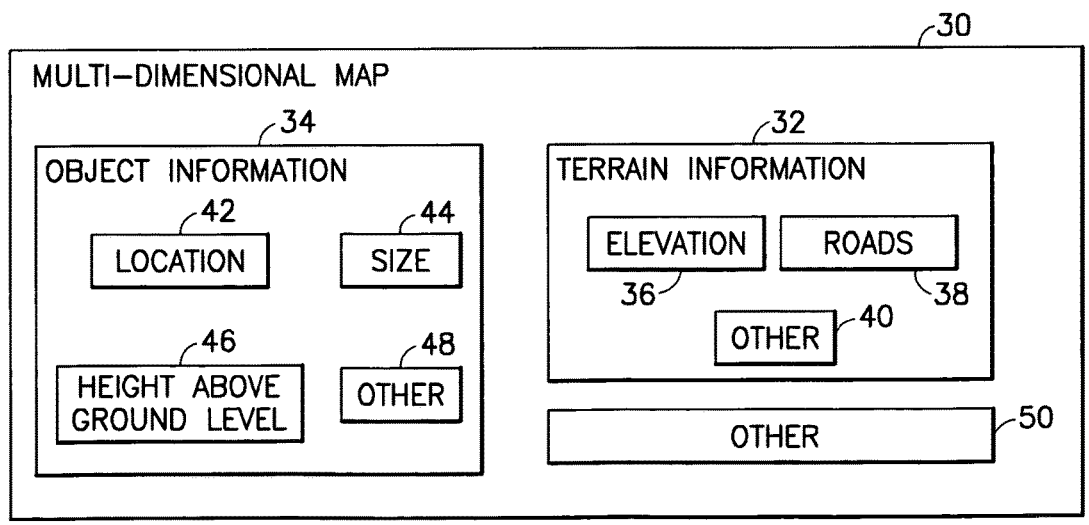
FIG. 2 is a block diagram illustrating one example of a multi-dimensional map.

Referring also to FIG. 2, a multi-dimensional (more than just two-dimensional) map 30 in the navigation system 14, such as stored in a memory 27 of the navigation system or stored in the memory 20, comprises terrain information 32 and object information 34. In one type of example, part of the memory 20 may form the navigation system memory. The terrain information 32 includes information such as terrain elevation 36, land road information 38, and perhaps other information 40. The terrain information 32 may be information obtained from at least one two dimensional land road map and a two-dimensional topographic map. The other terrain information 40 may include, for example, road overpass and underpass information, bridge information, road tunnel information, other road height restrictions, etc.

Figure 3:
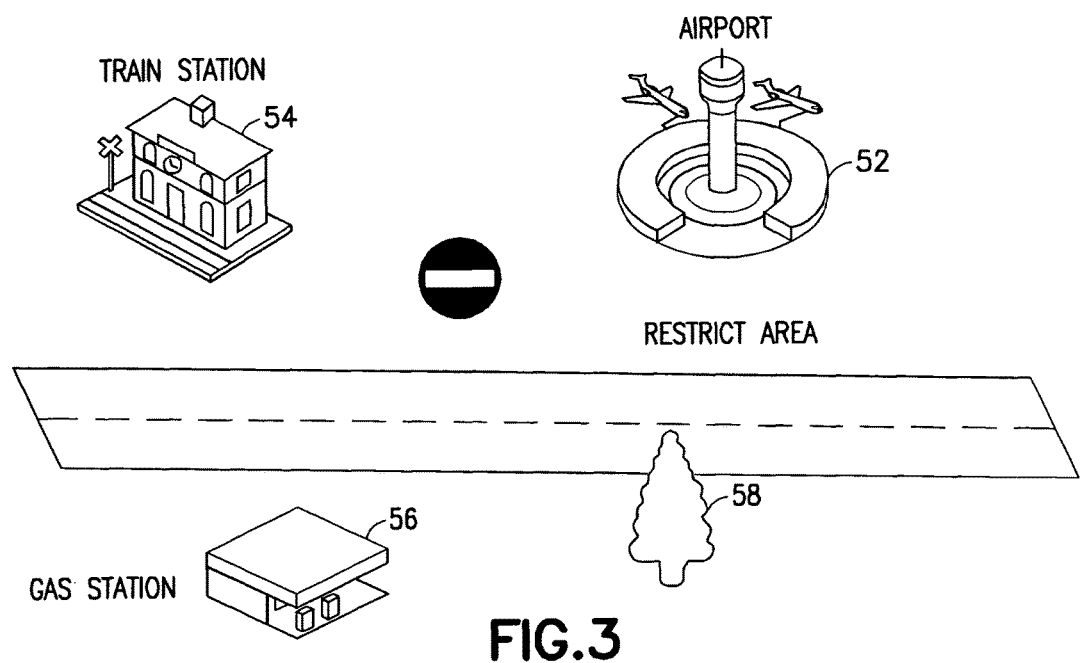
FIG. 3 is a diagram illustrating some examples of areas which might have restricted airspace for uncontrolled airspace travel.

The object information 34 may include information regarding specific objects which extend above ground level. Examples of such objects include, but are not limited to, trees, buildings, billboards, radio towers, etc. Information regarding these specific objects may include location information 42 (relative to the terrain information 32 for example), size information 44 (such as length and width on the ground), height above ground level information 46, and perhaps other information 48 relating to the objects which might have an impact on planning an aerial route above or around that object. The multi-dimensional map 30 may also include other information 50 which may be important to aerial navigation, such as restricted airspace for example. FIG. 3 illustrates some examples of objects which might have restricted airspace for close earth UAVs, such as an airport 52, a train station 54, a gas station 56 and a national park 58.

Figure 4:
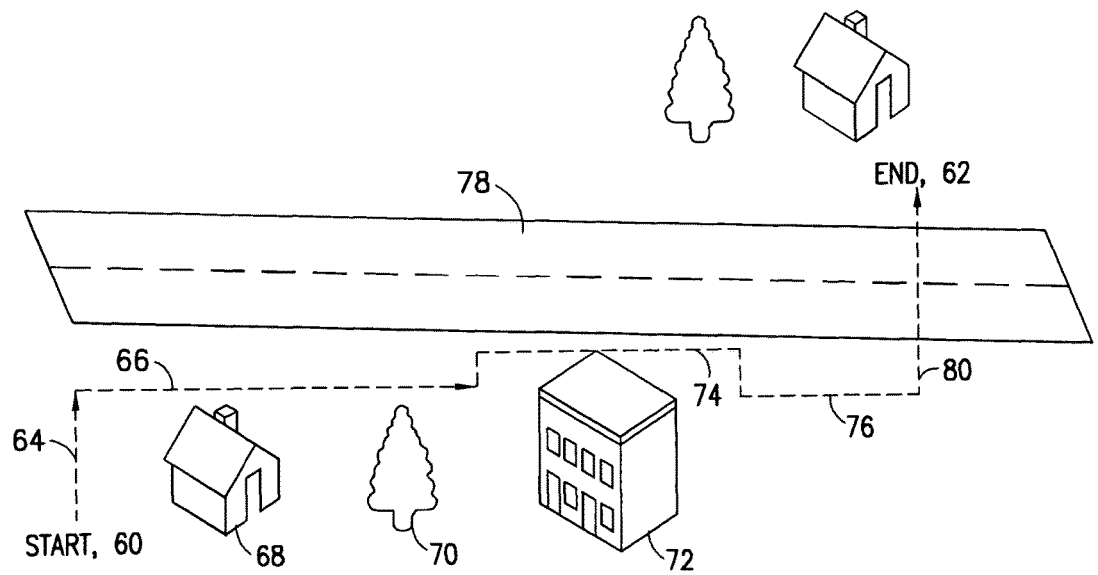
FIG. 4 is a diagram illustrating an example of a route generated with features as described herein.

Referring also to FIG. 4, an example of use of the map 30 is shown. In this example the vehicle 10 has a start location 60 on the ground and an end location or destination 62 on the ground. The path or route of the vehicle 10 is shown by the dotted line 64 between 60 and 62. The navigation system 14 uses the map 30 to plot the route 64 based upon the input destination 62 and knowledge of the starting location 60. The destination 62 may be received by the communications system 16 for example. During flight, information from the navigation system 14 may be used to select the altitude or flight height setting of the vehicle 10 above ground, and adjust the height/altitude of the vehicle 10 above ground based upon the terrain information 32 and the object information 34. In this example, after takeoff the vehicle 10 travels along a first segment 66 at a first altitude above the house 68 and tree 70. The altitude of the vehicle 10 along the segment 66 is set based at least partially upon the elevation of the ground at the start location 60 and the height of the house 66 and tree 70 as indicated by the multi-dimensional map 30. Thus, the controller 12 is able to control the flight of the vehicle 10 based upon the navigation system's plotted route including altitude for the vehicle to avoid interference with the height of the objects 68, 70 extending above ground level.

The vehicle 10 increases altitude to traverse over the building 72 at second segment 74. Again, the altitude of the vehicle 10 along the segment 74 is set based at least partially upon the elevation of the ground below the segment 74 and the height of the building 72 as indicated in the multi-dimensional map 30. Thus, the controller 12 is able to control the flight of the vehicle 10 based upon the navigation system's plotted route including altitude for the vehicle 10 to avoid interference with the height of the object 72 extending above ground level.

After passing over the building 72, the vehicle is able to reduce altitude to travel along third segment 76, changes direction to travel over road 78 along the fourth segment 80, and then lands at the destination 62 (such as at a house of a person who ordered goods to be delivered by the vehicle 10 for example). Please note that this is merely one example and should not be considered as limiting.

The height information 46 may be actual height information taken by a height estimator in the field (such as by a land vehicle traveling along a road for example), or downloaded from a database which comprises the height information, and/or estimated based upon photographic information currently present in 3-D mapping systems. These are merely some examples and should not be considered as limiting.

Figure 5:
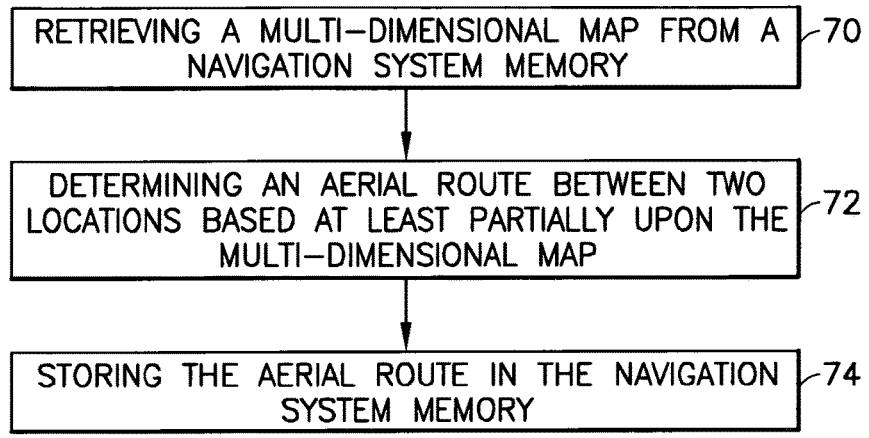
FIG. 5 is a diagram illustrating an example method.

Referring also to FIG. 5, an example method may comprise retrieving a multi-dimensional map from a navigation system memory as indicated by block 70, where the multi-dimensional map comprises terrain information and object information, where the object information comprises information regarding location and size of objects extending above ground level, where the objects are in uncontrolled airspace, and where the object information includes height information regarding a height above ground level of at least some of the objects; determining an aerial route between two locations based at least partially upon the multi-dimensional map as indicated by block 72, where the aerial route is limited to the uncontrolled airspace, where the aerial route is over and around at least some of the objects, and where the aerial route is determined, at least partially, based upon the height information of the objects; and storing the aerial route in the navigation system memory as indicated by block 74. The method may comprise selecting a destination for an unmanned aerial vehicle; performing the method noted above, where the destination is one of the two locations; and the unmanned aerial vehicle flying autonomously from a first one of the locations to the destination with use of the aerial route stored in the navigation system memory and with use of position information retrieved by the unmanned aerial vehicle during flight.

The method may further comprise dynamically changing the aerial route during flight of the unmanned aerial vehicle based upon input received during flight. The method may further comprise dynamically changing speed and altitude of an unmanned aerial vehicle during flight based upon input received during flight for collision avoidance with other unmanned aerial vehicles in case of an intersection of the aerial route with another aerial route. Determining the aerial route may comprise avoiding an aircraft flight restricted area. Determining the aerial route may comprise limiting the aerial route to predetermined flight areas in the uncontrolled airspace. Determining the aerial route may comprise determining ascent and descent safety takeoff and landing areas at the two locations. Determining the aerial route may comprise aerial traffic lanes for safety and privacy. Determining the aerial route may comprise limiting at least one area of possible aircraft flight based upon time of day.

An example apparatus may comprise at least one processor; and at least one non-transitory memory including computer program code, the at least one memory and the computer program code configured to, with the at least one processor, cause the apparatus to: retrieve a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding a height above ground level of at least some of the objects; determine an aerial route between two locations based at least partially upon the multi-dimensional map, where the aerial route is limited to the uncontrolled airspace, where the aerial route is over and around at least some of the objects, and where the aerial route is determined, at least partially, based upon the height information of the objects; and store the aerial route in the navigation system memory.

The at least one memory and the computer program code may be configured to, with the at least one processor, cause the apparatus to: select a destination for an unmanned aerial vehicle, where the destination is one of the two locations; and the unmanned aerial vehicle flying autonomously from a first one of the locations to the destination with use of the aerial route stored in the navigation system memory and with use of position information retrieved by the unmanned aerial vehicle during flight. The at least one memory and the computer program code may be configured to, with the at least one processor, cause the apparatus to dynamically change the aerial route during flight of the unmanned aerial vehicle based upon input received during flight. The at least one memory and the computer program code may be configured to, with the at least one processor, cause the apparatus to determine the aerial route comprising avoiding an aircraft flight restricted area. The at least one memory and the computer program code may be configured to, with the at least one processor, cause the apparatus to determine the aerial route comprising limiting the aerial route to predetermined flight areas in the uncontrolled airspace. The at least one memory and the computer program code may be configured to, with the at least one processor, cause the apparatus to determine the aerial route comprising determining ascent and descent safety takeoff and landing areas at the two locations. The at least one memory and the computer program code may be configured to, with the at least one processor, cause the apparatus to determine the aerial route comprising aerial traffic lanes for safety and privacy. The at least one memory and the computer program code may be configured to, with the at least one processor, cause the apparatus to determine the aerial route comprising limiting at least one area of possible aircraft flight based upon time of day.

An example embodiment may be provided in a non-transitory program storage device readable by a machine, tangibly embodying a program of instructions executable by the machine for performing operations, the operations comprising: retrieving a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding height above ground level of at least some of the objects; determining an aerial route between two locations based at least partially upon the multi-dimensional map, where the aerial route is limited to the uncontrolled airspace, where the aerial route is over and around at least some of the objects, and where the aerial route is determined, at least partially, based upon the height information of the objects; and storing the aerial route in the navigation system memory.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

An example apparatus may comprise means for retrieving a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding a height above ground level of at least some of the objects; means for determining an aerial route between two locations based at least partially upon the multi-dimensional map, where the aerial route is limited to the uncontrolled airspace, where the aerial route is over and around at least some of the objects, and where the aerial route is determined, at least partially, based upon the height information of the objects; and means for storing the aerial route in the navigation system memory. The apparatus may further comprise means for selecting a destination for an unmanned aerial vehicle, where the destination is one of the two locations; and means for flying the unmanned aerial vehicle autonomously from a first one of the locations to the destination with use of the aerial route stored in the navigation system memory and with use of position information retrieved by the unmanned aerial vehicle during flight. The apparatus may further comprise means for changing the aerial route during flight of the unmanned aerial vehicle based upon input received during flight. The apparatus may further comprise means for avoiding an aircraft flight restricted area. The apparatus may further comprise means for limiting the aerial route to predetermined flight areas in the uncontrolled airspace. The apparatus may further comprise means for determining ascent and descent safety takeoff and landing areas at the two locations. The apparatus may further comprise means for determining aerial traffic lanes for safety and privacy. The apparatus may further comprise means for limiting at least one area of possible aircraft flight based upon time of day.

Figure 6:
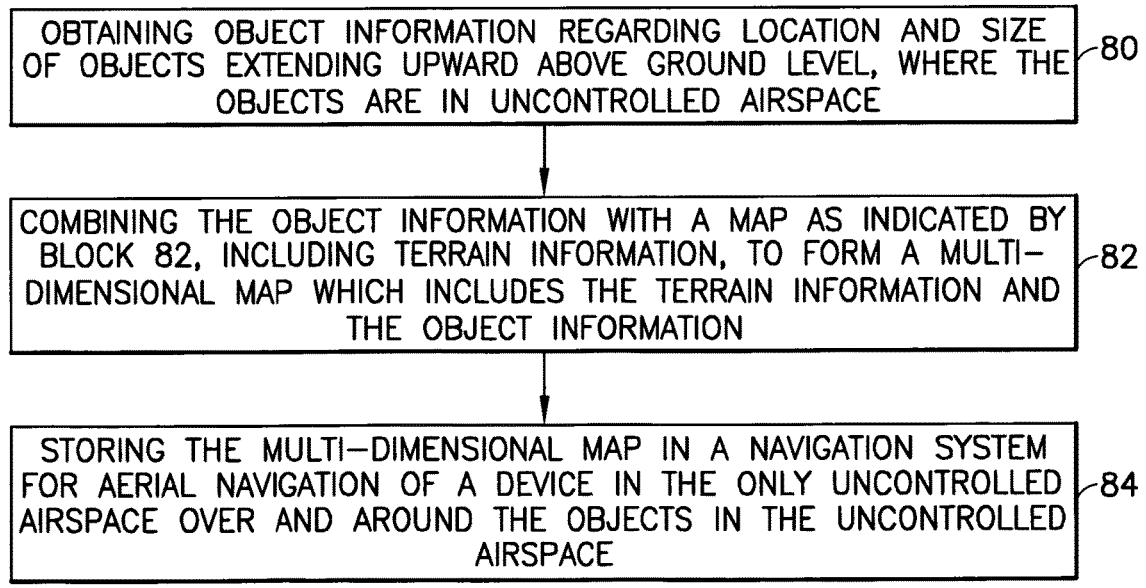
FIG. 6 is a diagram illustrating an example method.

Referring also to FIG. 6, an example method may comprise obtaining object information regarding location and size of objects extending upward above ground level, where the objects are in uncontrolled airspace as indicated by block 80, and where the object information includes height information regarding height of the objects above ground level; combining the object information with a map as indicated by block 82, including terrain information, to form a multi-dimensional map which includes the terrain information and the object information; and storing the multi-dimensional map in a navigation system for aerial navigation of a device in the only uncontrolled airspace over and around the objects in the uncontrolled airspace as indicated by block 84. The method may further comprise updating the object information based upon changes in the height over time of at least some of the objects.

Although features have been described herein in regard to an unmanned autonomous aerial vehicle, features may be used in a manned vehicle or an unmanned vehicle which may be at least partially controlled non-autonomously.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:
   retrieving a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding a height above ground level of at least some of the objects;
   determining an aerial route between two locations based at least partially upon the multi-dimensional map, where the aerial route is limited to the uncontrolled airspace, where the aerial route is over and around at least some of the objects, where the aerial route is determined, at least partially, based upon the height information of the objects and comprises aerial traffic lanes for safety and privacy, and wherein the aerial route is determined by precluding at least one area of possible aircraft flight based on time of day; and
   storing the aerial route in the navigation system memory.

2. A method comprising:
   selecting a destination for an unmanned aerial vehicle;
   performing the method as in claim 1, where the destination is one of the two locations; and
   the unmanned aerial vehicle flying autonomously from a first one of the locations to the destination with use of the aerial route stored in the navigation system memory and with use of position information retrieved by the unmanned aerial vehicle during flight.

3. A method as in claim 2 further comprising dynamically changing the aerial route during flight of the unmanned aerial vehicle based upon input received during flight.

4. A method as in claim 2 further comprising dynamically changing speed and altitude of an unmanned aerial vehicle during flight based upon input received during flight for collision avoidance with other unmanned aerial vehicles in case of an intersection of the aerial route with another aerial route.

5. A method as in claim 1 where determining an aerial route comprises avoiding an aircraft flight restricted area.

6. A method as in claim 1 where determining an aerial route comprises limiting the aerial route to predetermined flight areas in the uncontrolled airspace.

7. A method as in claim 1 where determining an aerial route comprises determining ascent and descent safety takeoff and landing areas at the two locations.

8. A method as in claim 1, wherein the aerial traffic lanes are dynamically managed to alter at least one of direction of the aerial traffic lanes or closure of the aerial traffic lanes.

9. A method as in claim 1, wherein the aerial traffic lanes comprise time zone restrictions to prohibit use at predetermined times of day.

10. An apparatus comprising:
    at least one processor; and
    at least one non-transitory memory including computer program code, the at least one memory and the computer program code configured to, with the at least one processor, cause the apparatus to:
      retrieve a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding a height above ground level of at least some of the objects;
      determine an aerial route between two locations based at least partially upon the multi-dimensional map, where the aerial route is limited to the uncontrolled airspace, where the aerial route is over and around at least some of the objects, and where the aerial route is determined, at least partially, based upon the height information of the objects and comprises aerial traffic lanes for safety and privacy, and wherein the aerial route is determined by precluding at least one area of possible aircraft flight based on time of day; and
      store the aerial route in the navigation system memory.

11. An apparatus as in claim 10 where the at least one memory and the computer program code are configured to, with the at least one processor, cause the apparatus to:
    select a destination for an unmanned aerial vehicle, where the destination is one of the two locations; and
    the unmanned aerial vehicle flying autonomously from a first one of the locations to the destination with use of the aerial route stored in the navigation system memory and with use of position information retrieved by the unmanned aerial vehicle during flight.

12. An apparatus as in claim 11 where the at least one memory and the computer program code are configured to, with the at least one processor, cause the apparatus to dynamically change the aerial route during flight of the unmanned aerial vehicle based upon input received during flight.

13. An apparatus as in claim 10 where the at least one memory and the computer program code are configured to, with the at least one processor, cause the apparatus to determine the aerial route comprising avoiding an aircraft flight restricted area.

14. An apparatus as in claim 10 where the at least one memory and the computer program code are configured to, with the at least one processor, cause the apparatus to determine the aerial route comprising limiting the aerial route to predetermined flight areas in the uncontrolled airspace.

15. An apparatus as in claim 10 where the at least one memory and the computer program code are configured to, with the at least one processor, cause the apparatus to determine the aerial route comprising determining ascent and descent safety takeoff and landing areas at the two locations.

16. A non-transitory program storage device readable by a machine, tangibly embodying a program of instructions executable by the machine for performing operations, the operations comprising:

retrieving a multi-dimensional map from a navigation system memory, where the multi-dimensional map comprises terrain information and object information, where the object information comprises information regarding location and size of objects extending above ground level, where the objects are in uncontrolled airspace, and where the object information includes height information regarding height above ground level of at least some of the objects;

determining an aerial route between two locations based at least partially upon the multi-dimensional map, where the aerial route is limited to the uncontrolled airspace, where the aerial route is over and around at least some of the objects and comprises aerial traffic lanes for safety and privacy, where the aerial route is determined, at least partially, based upon the height information of the objects, and wherein the aerial route is determined by precluding at least one area of possible aircraft flight based on time of day; and storing the aerial route in the navigation system memory.

\* \* \* \* \*